D. F. HULL.
MACHINES FOR PREPARING CORN FODDER.
No. 194,776. Patented Sept. 4, 1877.
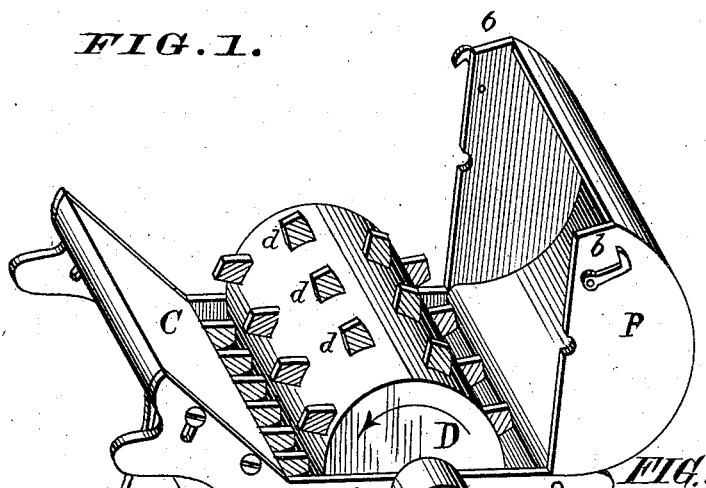
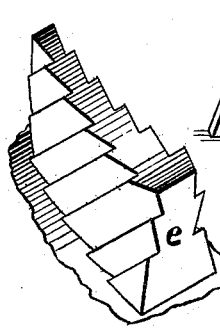
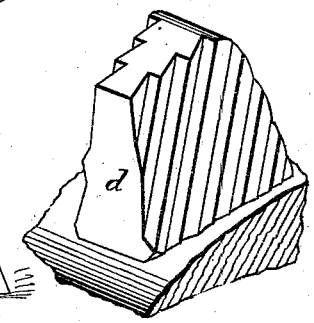
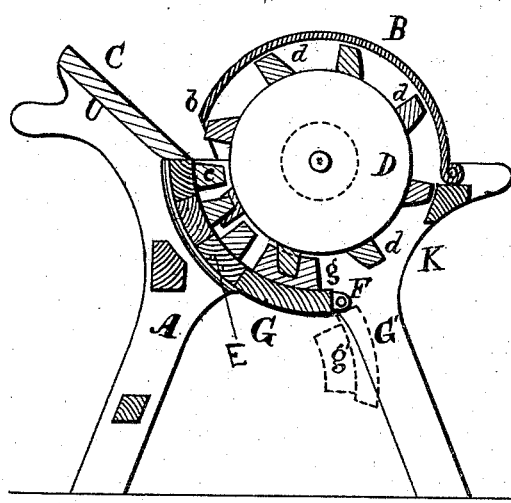
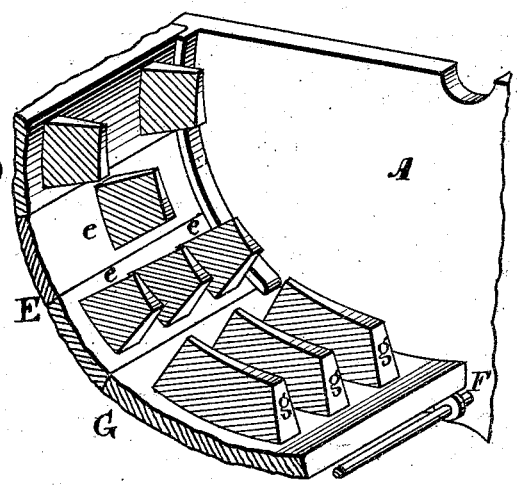

UNITED STATES PATENT OFFICE.

DAVIT F. HULL, OF HAGERSTOWN, MARYLAND, ASSIGNOR TO HAGERSTOWN AGRICULTURAL IMPLEMENT MANUFACTURING COMPANY, OF SAME PLACE.

IMPROVEMENT IN MACHINES FOR PREPARING CORN-FODDER.

Specification forming part of Letters Patent No. 194,776, dated September 4, 1877; application filed April 2, 1877.

*To all whom it may concern:*

Be it known that I, DAVIT F. HULL, of Hagerstown, in Washington county, Maryland, have invented certain Improvements on Machines for Preparing Corn and other Coarse Fodder, of which the following is a specification:

The object of my invention is to prepare corn-fodder stalks and other rough feed for stock; and it consists in an improved machine specially adapted for accomplishing said objects by first breaking, and then rubbing or grinding, the material by means of a cylinder revolving in a concave, both cylinder and concave being furnished with projecting rubbers.

Figure 1 is a perspective view of a machine containing my improvements, the cover being thrown back to expose the cylinder. Fig. 2 is a transverse section of the same, the cylinder being shown in elevation. Fig. 3 is a perspective view, on an enlarged scale, of a portion of the concave.

Diagrams 4 and 5 represent, respectively, a rubber of the concave and of the cylinder.

A is the frame of the machine; C, the feed-board; D, the cylinder, revolving upon its bearings, which rest in suitable boxes, supported by the frame A. B is the cover which closes over the cylinder, as seen in Fig. 2, and prevents too large an amount of fodder being fed to the cylinder at once.

The front corners *b b* of the cover are cut off, to permit the stalks coming close in to the cylinder, so as to be caught by the rubbers. The feed-board and cover thus form a gage for the stalks, and regulate the amount to be fed in at once.

The cylinder D is studded with rubbers *d d*, which are fluted or roughened on their sides, as shown in Diagram 5, the diagram being somewhat exaggerated in this respect.

The frame A also supports the concave E. This concave is furnished with rubbers *e*, fluted or roughened like the rubbers of the cylinder. G is a supplementary concave, which may be used or not, according as it is desired to rub the fodder more or less. When desired not to use it, the pin H, Fig. 1, is withdrawn, and it is dropped to the position G', Fig. 2. This supplementary concave is designed more especially for grinding or breaking corn in the ear, for feeding stock, and for this purpose the rubbers *g* are made somewhat larger than the other rubbers of the machine.

It will be observed that the upper row of rubbers of the concave is close up to the bottom of the feed-board, and forms a rack or open bottom to the hopper formed by the feed-board C and cover B.

The fodder being fed onto the feed-board C, falls down and rests upon the upper row of rubbers of the concave until caught by the rubbers of the cylinder, when it is broken into pieces of suitable size, and dragged down and ground between the roughened sides of the rubbers, and finally delivered at K, in a fit condition for feeding to stock.

As each row of rubbers on the cylinder takes its quantum of stalks from the feed-board, breaking and grinding them as before stated, the action of the machine is continuous.

The sides A of the frame I make of metal, so that they will support the journal-boxes of the cylinder and the concave without bracing.

I am aware that machines having a concave and revolving cylinder have been used for preparing fodder; but all such machines have saws or other devices, which require sharpening to make them work successfully, and, owing to the sand and dirt on the fodder, can remain sharp but a short time; and to sharpen them requires considerable time and the attention of a workman possessing a skill which is seldom found among the persons who use these machines. My machine, on the contrary, has no devices which require sharpening, the rubbers acting by the rubbing or grinding action of their roughened sides, and if a rubber becomes worn or broken it can be removed and replaced by a new one by any ordinary man; and, owing to the peculiar action of the rubbers, the fodder is much more rapidly prepared, and is in much better condition for the stock to eat, than when prepared with other machines.

Having thus described my invention, I claim—

1. The supplementary concave G, when constructed and operating substantially as and for the purpose described.

2. The combination of the inclined feed-board C and cover B, with its edges cut away at b, for the purpose of feeding stalks to the machine and regulating the amount of feed, substantially as set forth.

3. In combination with the feed-board and cut-away cover B forming a hopper, the upper row of concave rubbers forming a rack, or open bottom to the hopper, substantially as and for the purpose specified.

4. The combination of cylinder D, concave E, feed-board C, and cut-away cover B, substantially as and for the purposes described.

DAVIT F. HULL.

Witnesses:
JOHN M. KNODLE,
W. S. APPLEMAN.